Patented Nov. 29, 1949

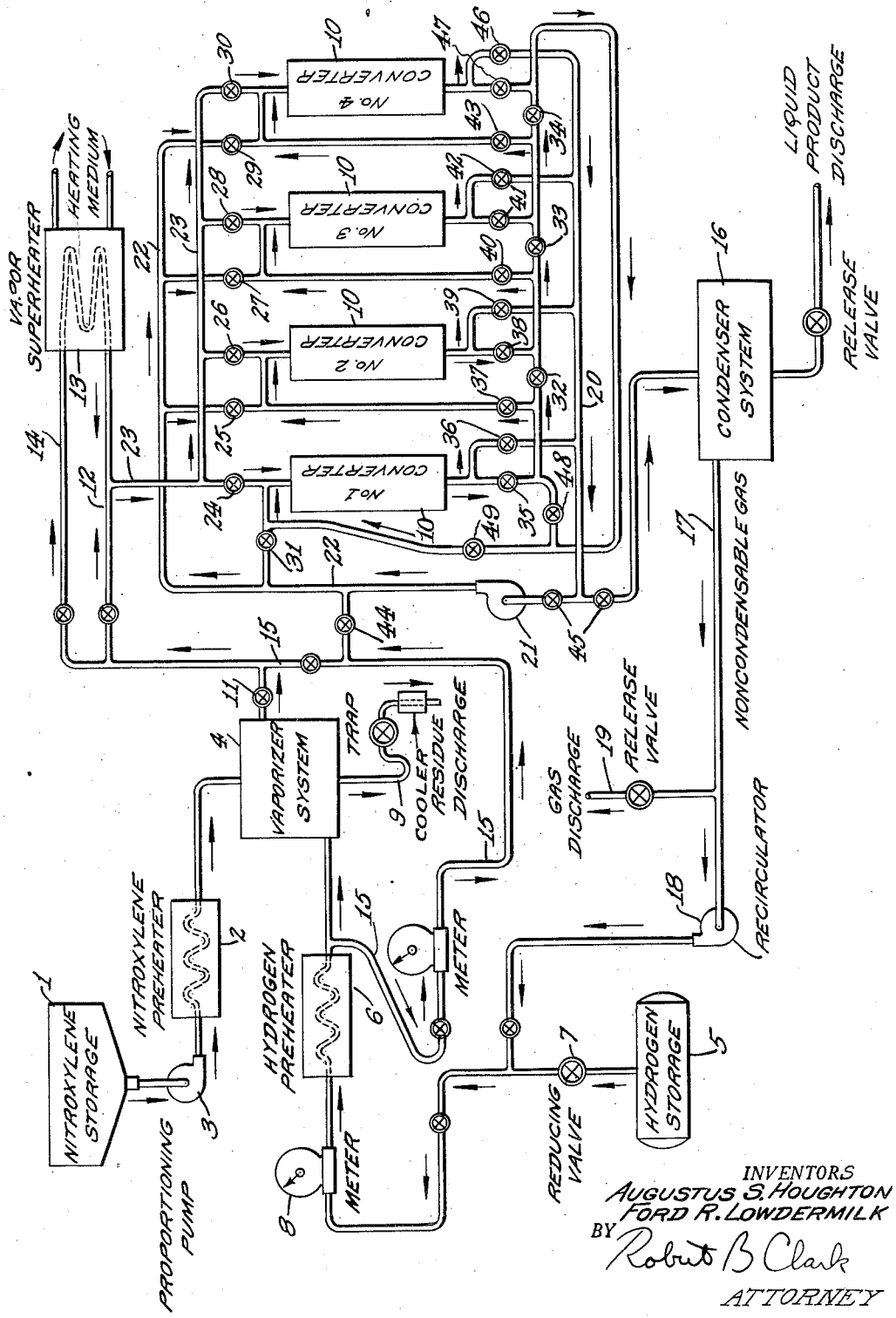

2,489,886

UNITED STATES PATENT OFFICE 2,489,886

PRODUCTION OF XYLIDINE

Augustus S. Houghton, Rivervale, N. J., and Ford R. Lowdermilk, Philadelphia, Pa., assignors to Allied Chemical & Dye Corporation, New York, N. Y., a corporation of New York Application November 1, 1945, Serial No. 626,136

5 Claims. (Cl. 260—580)

1

The invention described herein is subject to a license of this date to the Government of the United States.

This invention relates to the production of xylidine by vapor phase catalytic hydrogenation of nitroxylene over a nickel catalyst.

It is an object of this invention to provide a new and especially advantageous method of activating the nickel catalyst employed in such hydrogenation, and particularly to carry out such activation of the catalyst in conjunction with the hydrogenation process itself.

The prior art, for example Sabatier's book on Catalysis in Organic Chemistry, describes vapor phase catalytic hydrogenation of nitro compounds such as nitrobenzene employing a nickel catalyst. The nickel catalysts for such prior art hydrogenation have generally been prepared by decomposing a nickel salt by means of heat to nickel oxide, and then activating the nickel oxide for use as a catalyst by reduction in a stream of hydrogen. The prior art has recognized that a number of substances are capable of poisoning a nickel catalyst and accordingly it has been customary to employ substantially pure hydrogen as the activating gas. Activation by this method has a number of disadvantages, particularly when employed to prepare a nicked catalyst for hydrogenation of aromatic nitro compounds on a commercial scale, and especially when, in such hydrogenation, it is desired to put into operation successive beds of nickel catalyst during the hydrogenation in order to carry on the hydrogenation continuously. In the first place, the continued use of pure hydrogen for catalyst activation adds a substantial item of cost to the commercial process. In addition, it has been found that when a new catalyst bed was to be put into operation in commercial equipment where hydrogenation of nitro compounds had been going on for some time, and pure hydrogen gas was bypassed around the nitro compound vaporizer system so as to pass hydrogen alone into the converter system for activation of the new catalyst bed, the new catalyst often would attain only a low degree of activation even upon continued treatment with the hydrogen gas and the catalyst which it was thus attempted to activate would often prove to be completely unsuitable for use in the hydrogenation process.

Moreover, the prior art work on hydrogenation of aromatic nitro compounds has been limited almost exclusively to nitrobenzene hydrogenation, and accordingly has provided little, if any, basis for determining methods of catalyst activation

2 suitable for preparation of catalysts operative to promote hydrogenation of nitroxylene.

We have now discovered that activation of a nickel catalyst for use in vapor phase catalytic hydrogenation of nitroxylene to xylidine may be quite advantageously effected by employing as activating medium the converter effluent gas resulting from such hydrogenation process, provided such converter effluent gas contains an appreciable quantity of free hydrogen, but not more than about 5% by weight nitroxylene based on total organic material in said gas. Preferably the proportion of nitroxylene should be not more than 2%, and it is most advantageously maintained under 1%.

Thus, we have found that although nitroxylene when present in amount over about 5% of the total organics, poisons the catalyst and, moreover, has such an effect on unreduced nickel catalyst that there is great danger that such catalyst cannot thereafter be activated even by long continued treatment with 100% pure hydrogen, the extremely high content of the amine, xylidine, a fairly similar organic material, in the converter effluent gas used for catalyst activation surprisingly has no undesirable effect on the catalyst, even though it is present in amount hundreds of times that of the nitro compound; even large amounts of xylidine in no way interfere with activation of the catalyst by the hydrogen present in the converter effluent gas. The fact that nitroxylene, when present in amount over about 5% of total organics, poisons an unreduced catalyst, is particularly surprising in view of the fact that nitrobenzene has not been found to exert a similar poisoning effect.

Moreover, when water vapor is present even to the extent of one mol percent in otherwise pure hydrogen, it has been found to prevent reduction of nickel oxide by that hydrogen. The substantial percentage of water vapor present in converter effluent gas from hydrogenation of aromatic nitro compounds to aromatic amines, however, does not interfere with catalyst reduction; the reason for this may possibly be that the aromatic amine has an ameliorating effect, preventing the water vapor from interfering with reduction by the hydrogen present.

It is desirable that the nitroxylene content of the activating gas should be maintained below the indicated maximum of 5% by weight of the total organic content of the gas until activation, i. e. reduction of the catalyst, is entirely complete. Otherwise, as above indicated, there is great danger that the catalyst cannot later be activated. It is also desirable that the catalyst during activation is maintained at a temperature above the dewpoint for any of the normally liquid material in the gas.

Activation in accordance with the process of our invention has the advantage, of course, of a substantial reduction in cost over the use of relatively expensive pure hydrogen. The process of our invention has the further advantage, when operating in the customary manner involving the use of a plurality of catalyst beds, that a relatively simple arrangement of conduits between the converter units makes it possible to activate and put into operation a new catalyst bed with part of the effluent gas from the converter beds in operation. By such application of our activation methods, the process of activation thus may be combined with the process of hydrogenation, giving a combination process of unusual efficiency. Such operation is illustrated in the drawing described in more detail below.

Moreover, we have found that the reason that catalyst activation has often been unsuccessful, employing pure hydrogen gas in commercial equipment where hydrogenation has been going on for some time, is that the hydrogen gas for catalyst activation has generally been bypassed around the nitroxylene vaporizer system into the converter system for activation of a new catalyst bed and that in this procedure the activating gas has generally tended to pick up nitroxylene present as residue in the piping and equipment leading to the converter and the nitroxylene thus picked up has affected the unreduced catalyst so as to make subsequent activation thereof difficult or impossible. In the combination process of our invention above referred to, where a part of the effluent gas from the converter system is recirculated to any converter unit containing a new charge of unreduced catalyst, if nitroxylene is picked up in connecting lines, the amount thereof does not exceed 5% by weight of the total organics present. Furthermore, since the effluent gases employed in accordance with our invention are at a temperature suitable for reduction, no preheating thereof is required.

The nickel catalyst employed as the catalyst of our invention is one of the known nickel hydrogenation catalysts in which nickel or a compound thereof is the essential catalytic ingredient. The term "nickel catalyst" as used herein is intended to include all such catalysts, whether metallic nickel or a compound thereof is the essential catalytic ingredient. It is understood that in its activated (i. e. reduced) form, such a catalyst contains a substantial amount of metallic nickel. A particularly advantageous catalyst for use in the process of our invention is a catalyst which in its unreduced form consists of nickel oxide supported on a pumice base. Such a catalyst may be made, for example, by impregnating, with molten nickel nitrate, pumice which has been cleaned by boiling in nitric acid; the impregnated pumice is then drained and the nitrate decomposed by heating, leaving nickel oxide dispersed on the pumice support. The preparation of other nickel hydrogenation catalysts up to the step of their activation or reduction has been described in the art.

The accompanying drawing contains a flow diagram illustrative of a preferred method of carrying out the process of our invention, applied to the hydrogenation of nitroxylene to xylidine under superatmospheric pressure.

The process of hydrogenation will first be briefly described in its entirety. In this process the liquid nitroxylene reactant is vaporized in a stream of hydrogen. With reference to the drawing, this is accomplished by pumping liquid nitroxylene from storage tank 1 through preheater 2 by means of proportioning pump 3, by which the amount of liquid nitroxylene employed in the process can be regulated. From preheater 2 the liquid nitroxylene passes to the vaporizer system 4. The pump 3 also serves to bring the nitroxylene up to the working pressure maintained in the entire system which in the illustrated operation is about 10 atmospheres pressure.

Gaseous hydrogen from storage tank 5 is similarly passed to hydrogen preheater 6 through reducing valve 7 and meter 8. Valve 7 serves to reduce the hydrogen maintained under high pressure in storage to the working pressure maintained in the system. From preheater 6 the hydrogen also passes to the vaporizer system 4.

The nitroxylene reactant may be a substantially pure single mononitroxylene or a mixture of mononitroxylene isomers. The reactant will generally contain several isomeric mononitroxylenes, all of which may advantageously be hydrogenated to form a mixed xylidine product. Commercial nitroxylene generally contains, in addition to the mononitro compounds, small amounts of more highly nitrated material as an impurity. Since this more highly nitrated material, when present in substantial amount, may interfere with the efficient operation of the process, it may be completely removed by a preliminary fractional distillation, or may be partially removed during vaporization of the nitro compound. In the latter case the vaporization is preferably carried out in vaporizer system 4, in such a way as to remove highly nitrated impurities with minimum explosion hazards. This may be done, for example, by intimately contacting the liquid nitro compound with the stream of hydrogen gas and imparting sufficient heat to vaporize all or a substantial part of the mononitro material. High-boiling liquid, which, for example, may be high in polynitro material, is separated out by the trap 9 and the associated conduits shown on the drawing, a cooler being provided at the outlet to reduce explosion hazards. This leaves a gas and vapor mixture of hydrogen and mononitro compound suitable for use in the hydrogenation process.

In preferred operation, the amount of nitroxylene and hydrogen are regulated by pump 3 and meter 8 on the basis of maintenance of desirable physical conditions rather than on chemical requirements. That is, sufficient hydrogen gas is employed to ensure that the reaction mixture is above its nitroxylene dewpoint, and to maintain a desirable velocity of gas flow through the equipment. This may involve the use of from about 7 to 77 cubic feet of hydrogen, measured at room temperature and at the working pressure of about 10 atmospheres, per pound of vaporized nitroxylene. Under these conditions a large excess of hydrogen over the stoichiometric quantity required will generally be present, for example an excess of hydrogen of the order of 1000 to 7000% over the stoichiometric quantity for reduction of the nitro group.

The vapor mixture leaving vaporizer system 4 is sent to converters 10 through valve 11. The vapor mixture may be superheated before entering the converter in superheater 12 in which case by proper adjustment of valves indicated on the drawing it is passed through conduit 14 rather than conduit 12. If it is not desired to superheat the vapor it may be passed directly through conduit 12 to feed header 23. In some cases, it may be desirable to add additional hydrogen to the vapor mixture from vaporizer system 4; such additional hydrogen may be brought in through the conduit system 15. In any event, the temperature and gas composition are generally so adjusted that the reaction gas mixture in contact with catalyst is at a temperature above its dewpoint for the particular composition employed; the adjustment of temperature and gas composition should, of course, also take into account the desired conditions of catalyst temperature and rates of flow in the converters for maintaining conversion of nitro compound to aromatic amine at at least 95% so as to produce an effluent gas containing not more than 5% nitro compound, based on total organic material present which, as above pointed out, is necessary in order that the effluent gas should be suitable for catalyst activation purposes. To obtain an effluent gas containing this low content of nitro compound in the production of aromatic amines over a nickel catalyst, the temperature of the greater part of the catalyst should generally be maintained in the range of about 200° to 400° C., preferably in the range 225° to 330° C., the average contact time should be in the range of about 0.1 to 2 seconds, preferably in the range 0.3 to 1 second, and the hydrogenation should preferably be carried out under a pressure of at least 5 atmospheres, preferably at least 7 atmospheres, and most advantageously in the range 10 to 20 atmospheres.

The converter system consists of a plurality of catalyst chambers, four such chambers being indicated on the drawing. These are packed with the nickel catalyst employed for the hydrogenation reaction, preferably consisting of nickel on a pumice support, as above described. The reaction gas may be passed either in series or parallel flow through all or some of these catalyst chambers. The arrangement of valves and conduits for determining such flow and for activating new catalyst charges with the converter effluent gas will be described in detail below.

The effluent gas finally withdrawn from the converter system is passed through the condenser system 16 where the xylidine product, the water of reaction, and any other normally liquid material is condensed out and cooled. The non-condensable gas withdrawn through conduit 17 contains substantially only unreacted hydrogen and inert gases and is generally suitable for recirculation by blower 18 and reuse in the process of the invention. Should there be substantial accumulation of inert gases, it is desirable to bleed off a portion of the non-condensable gas through conduit 19, so as to keep the proportion of inert gases low in the recirculated hydrogen-containing gas.

In preferred operation the heaters, the vaporizer system, the converter system, the condenser system, and all connecting piping are maintained under the working pressure which in the operation illustrated is, as above stated, about 10 atmospheres.

In accordance with the process of our invention, a portion of the converter effluent gas collected in the effluent header 20 may be drawn off by recirculator 21 and passed to the activating gas header 22 whenever it is desired to activate a new catalyst charge. Supposing, for the purpose of illustration, that it is desired to place a new charge of unreduced catalyst in #2 converter and activate this catalyst charge while continuing to operate converters #1, #3, and #4, in series. Valve 24 leading from feed header 23 to converter #1 is kept open while valves 26, 28 and 30 to the other converters remain closed. To maintain series flow in converters #1, #3, and #4, valves 35, 32, 40, 41, 43 and 46 are kept open while valves 36, 37, 38, 39, 33, 42, 34, 47, 48 and 49 are kept closed. Spent catalyst may then be discharged from converter #2 and a new charge of unreduced catalyst placed therein. Either a portion or all of the converter effluent gas withdrawn into conduit 20 from the last converter in the series may then, by suitable adjustment of the valves 45, be recirculated by blower 21 into activating gas header 22. Valves 31, 27 and 29 leading from the header 22 to converters #1, #3 and #4 are kept closed while valve 25 leading to converter #2 and valve 39 leading out of converter #2 to the effluent header are kept open. Effluent gas is thus passed through converter #2 and the hydrogen in said gas activates the new charge of catalyst therein. When activation is complete, converter #2 may be put back in operation by proper adjustment of the various valves.

By analogous arrangements of the various valves, any one or more of the converters may be taken out of operation for the purpose of charging it with new catalyst and the new charge of catalyst may be activated with effluent gas from the remaining converters which may be maintained in either series or parallel operation.

When a plant such as that illustrated in the drawing is first placed in operation or whenever there is not a suitable quantity or quality of effluent gas for activation of new catalyst charges, hydrogen may be employed temporarily for activation, such hydrogen preferably being by-passed from the conduit system 15 to activating gas header 22 by means of valve 44. It would generally be necessary to supply heat to hydrogen thus employed for activation, whereas converter effluent gas is generally already at a suitably high temperature and no further heating thereof is necessary.

Activation may be carried out at a temperature of 215° to 300° C., but is preferably carried out at 225° to 250° C. The time that should be allowed for activation of a new catalyst charge depends on many factors of which the temperature of activation is the most important. Thus, when employing temperatures in the lower portions of the above ranges for activating a new catalyst with the effluent from xylidine production, at least 8 hours' activation time will generally be required, whereas when temperatures in the upper portions of the ranges are employed about 3 hours' time may be sufficient. Within these ranges the minimum time required for activation will generally vary inversely with the temperature. Other factors affecting the time are the percent hydrogen in the effluent gas, the nature of the catalyst bed and the rate of flow of activating gas. The effect of these various factors can readily be determined for any particular plant. It is important in any event that treatment with activating gas be continued until the catalyst is completely activated since the introduction of reaction gas containing a substantial amount of nitro compound into an incompletely reduced catalyst bed will generally permanently impair the activity of that catalyst.

The following examples are illustrative of the process of our invention:

Example 1

In an arrangement of two converters in series similar to that described above, nitroxylene was hydrogenated in the lead converter and the effluent gas mixture from this converter was used for reduction of supported nickel oxide in the second converter. From 220 to 370 pounds of nitroxylene were hydrogenated per hour. The temperature in the second converter was maintained at 230 to 235° C. for 8½ hours. During this time the total dimethylcyclohexylamine content of the organic reaction product did not exceed one percent, showing that very little ring hydrogenation was occurring in either converter. In both converters the unconverted nitroxylene never exceeded 0.2% of the nitroxylene charged.

At the end of the 8½ hours, both the converter containing new catalyst and the first converter were used for hydrogenation of nitroxylene. 9,250 pounds of nitroxylene were completely hydrogenated per cubic foot of catalyst. At this point, the first converter was isolated from the system and the second converter, containing freshly reduced, active catalyst, was placed in the lead, by suitable manipulation of valves. The latter converter continued to yield substantially complete hydrogenation of nitroxylene to xylidine until 20,000 pounds of nitroxylene had been passed over each cubic foot of catalyst contained therein.

Example 2

In a plant similar to that described above and having an effective catalyst-filled volume of 1.5 cubic feet per converter, a mixture of mononitroxylenes was hydrogenated to form a mixed xylidine product. The non-condensable gas from the condenser system, containing the excess hydrogen, was recirculated at the rate of about 140 pounds per hour, or 2500 cubic feet per hour measured at the conditions prevailing at the recirculation compressor intake, i. e., 145 pounds per square inch gage and 23° C. On the downstream side of the compressor sufficient additional hydrogen was introduced as needed for reaction and for maintaining the pressure, i. e. at the rate of 7 to 12 pounds per hour. The mixture of isomeric mononitroxylenes was vaporized in the hydrogen gas stream at the rate of 150 to 250 pounds per hour and the vapor mixture was passed through one converter containing active nickel catalyst at a temperature between 200° and 300° C. and at an average pressure of 175 pounds per square inch gage.

The gases from the above hydrogenation converter contained, in terms of rate of flow per hour for a vaporization of 1 mol or 151 pounds of nitroxylene per hour, approximately:

| | Pounds |
|---|---|
| Hydrogen | 145 |
| Xylidine | 116.9 |
| Nitroxylene | 0.8 |
| Dimethylcyclohexylamine | 3.7 |
| Water | 35.8 |

When these gases were cooled to room temperature, the organic liquid condensate was found to contain, by analysis, about 0.6% nitroxylenes and 3.0% dimethylcyclohexylamines.

The above hydrogenated gas mixture, containing about 0.66% by weight of nitroxylene, based on total organics, and containing almost 3 mol percent of water vapor, based on the total of hydrogen and water present, was led without cooling through a second converter charged with unreduced nickel oxide deposited on a porous, granular support. The temperature in this converter was maintained at 280 to 290° C. and the pressure was between 170 and 150 pounds per square inch gage.

At the end of a 13½-hour period the nickel oxide in the second converter was sufficiently activated by reduction to be capable of catalyzing conversion with high efficiency. The catalyst so activated had a productivity of 20,000 pounds nitroxylene hydrogenated per cubic foot of catalyst.

Example 3

In a plant similar to that described in Example 2, a mixture of mononitroxylenes was hydrogenated to form a mixed xylidine product over a nickel catalyst and the converter effluent gas containing the xylidine vapor, water vapor, and unreacted hydrogen was employed to activate an unreduced supported nickel oxide catalyst in a second converter. The effluent gas used for catalyst activation contained about 0.3% unreduced nitro compound, based on the weight of total organics present, about 0.2% dimethylcyclohexylamines, and consisted predominantly, on a volume basis, of free hydrogen. The temperature of the nickel oxide during activation thereof was in the range of about 280 to 300° C. and activation was continued for a period of three hours. At the end of this three-hour period the nickel oxide in the second converter was sufficiently activated by reduction to be capable of catalyzing the hydrogenation of nitroxylene to xylidine.

Since certain changes may be made in carrying out the above process without departing from the scope of the invention it is intended that all matter contained in the above description shall be interpreted as illustrative and not in a limiting sense.

We claim:

1. In a process for vapor phase hydrogenation of nitroxylene to xylidine over a nickel catalyst, the steps that comprise activating a charge of unreduced nickel catalyst to be employed in such hydrogenation by passing in contact therewith, at a temperature in the range of about 215° to 300° C., converter effluent gas resulting from such a hydrogenation process, said effluent gas containing the xylidine product in vapor form, an appreciable quantity of free hydrogen, but not more than about 5% by weight nitroxylene, based on total organic material in said gas, and maintaining said catalyst above the dewpoint of the activating gas and free from contact with nitroxylene in higher proportion than that indicated until activation of the catalyst is substantially complete.

2. In a process for vapor phase hydrogenation of nitroxylene to xylidine over a nickel catalyst, the steps that comprise activating a charge of unreduced nickel catalyst to be employed in such hydrogenation by passing in contact therewith, at a temperature in the range of about 225° to 250° C., reaction product gas from such hydrogenation process, said gas containing xylidine vapor, an appreciable quantity of free hydrogen, but not more than about 5% by weight nitroxylene, based on total organic material in said gas, and maintaining said catalyst above the dewpoint of the activating gas and free from contact with nitroxylene in higher proportion than that indicated until activation of the catalyst is substantially complete.

3. A process for vapor phase hydrogenation of nitroxylene to xylidine, which comprises passing a gaseous mixture of hydrogen and nitroxylene vapor containing an excess of hydrogen over the stoichiometric quantity required for the hydrogenation reaction in contact with a nickel catalyst to convert at least about 95% of the nitroxylene to xylidine, passing gaseous reaction product resulting from said hydrogenation, at a temperature in the range of about 215° to 300° C., in contact with a charge of unreduced nickel catalyst subsequently to be employed in such a hydrogenation process to activate said catalyst, maintaining the proportion of nitro compound in such activating gas at a value not greater than about 5% of the total organic material in said gas, and continuing passage of the activating gas in contact with the charge of unreduced catalyst for a period of time ranging from a minimum of 3 hours to a minimum of 8 hours, the minimum activation time within said range varying inversely with the activation temperature employed within the range above indicated.

4. A process for vapor phase hydrogenation of nitroxylene to xylidine which comprises passing a gaseous mixture of hydrogen and nitro compound vapor containing an excess of hydrogen over the stoichiometric quantity required for the hydrogenation reaction in contact with a nickel catalyst to convert at least about 98% of the nitroxylene to xylidine, passing gaseous reaction product resulting from said hydrogenation, at a temperature in the range of about 215° to 300° C., in contact with a charge of unreduced nickel catalyst subsequently to be employed in such a hydrogenation process to activate said catalyst, maintaining said activating gas at a temperature above its dewpoint while in contact with catalyst, and maintaining the proportion of nitroxylene in such activating gas at a value not greater than about 2% of the total organic material in said gas until activation of the catalyst is substantially complete.

5. A process for vapor phase hydrogenation of nitroxylene to xylidine which comprises passing a gaseous mixture of hydrogen and nitroxylene vapor containing an excess of hydrogen over the stoichiometric quantity required for the hydrogenation reaction in contact with a nickel catalyst to convert at least about 99% of the nitroxylene to xylidine, passing gaseous reaction product resulting from said hydrogenation, at a temperature in the range of about 225° to 250° C., in contact with a charge of unreduced nickel catalyst subsequently to be employed in such a hydrogenation process to activate said catalyst, maintaining said activating gas at a temperature above its dewpoint while in contact with catalyst, and maintaining the proportion of nitroxylene in such activating gas at a value not greater than about 1% of the total organic material in said gas until activation of the catalyst is substantially complete.

AUGUSTUS S. HOUGHTON.
FORD R. LOWDERMILK.

REFERENCES CITED

The following references are of record in the file of this patent:

OTHER REFERENCES

Sabatier: "Catalysis in Organic Chemistry," published by D. Van Nostrand Co. of New York, page 15, article 56.

Yoshikawa and Kubota: "Production of Aromatic Amines by Hydrogenation," Chemical Abstracts, 30, 1754.

Certificate of Correction

Patent No. 2,489,886 November 29, 1949

AUGUSTUS S. HOUGHTON ET AL.

It is hereby certified that errors appear in the above numbered patent requiring correction as follows:

In the grant, line 1, name of inventor, for "Augustus S. Hougton" read *Augustus S. Houghton*; in the printed specification, column 1, line 28, for the word "nicked" read *nickel*; column 9, line 21, for "pediod" read *period*;

and that the said Letters Patent should be read with these corrections therein that the same may conform to the record of the case in the Patent Office.

Signed and sealed this 14th day of March, A. D. 1950.

[SEAL]

THOMAS F. MURPHY,
*Assistant Commissioner of Patents.*